(12) United States Patent
Hidaka et al.

(10) Patent No.: US 10,175,720 B2
(45) Date of Patent: Jan. 8, 2019

(54) ELECTRONIC APPARATUS

(71) Applicant: KYOCERA CORPORATION, Kyoto (JP)

(72) Inventors: Mizuho Hidaka, Kawasaki (JP); Norikazu Morioka, Tama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/379,811

(22) Filed: Dec. 15, 2016

(65) Prior Publication Data

US 2017/0097659 A1 Apr. 6, 2017

Related U.S. Application Data

(63) Continuation of application No. PCT/JP2015/068220, filed on Jun. 24, 2015.

(30) Foreign Application Priority Data

Jun. 26, 2014 (JP) .................................. 2014-131405

(51) Int. Cl.
*G06F 1/16* (2006.01)
*H05K 5/00* (2006.01)
(Continued)

(52) U.S. Cl.
CPC .......... *G06F 1/1626* (2013.01); *B06B 1/0603* (2013.01); *G06F 1/1605* (2013.01);
(Continued)

(58) Field of Classification Search
CPC .... G06F 1/1633; G06F 1/1637; G06F 1/1652; G06F 1/1626; G06F 1/1605; G06F 1/1643; H04M 1/0266; B06B 1/0603
(Continued)

(56) References Cited

U.S. PATENT DOCUMENTS 5,479,285 A * 12/1995 Burke ............... G02F 1/133308
248/638
7,245,076 B2 7/2007 Isohata et al.
(Continued)

FOREIGN PATENT DOCUMENTS

JP 9-8690 1/1997
JP 2002-323863 11/2002
(Continued)

OTHER PUBLICATIONS

International Search Report in intenational application No. PCT/JP2015/068220, dated Aug. 25, 2015, in 2 pages.
(Continued)

*Primary Examiner* — Anthony Haughton
(74) *Attorney, Agent, or Firm* — Duane Morris LLP

(57) ABSTRACT

An electronic apparatus is disclosed. An electronic apparatus comprises a case, a panel, a display, and a supporting component. The panel includes a layer of sapphire located on a surface of the electronic apparatus. The display comprises a first surface including a display screen and a second surface opposite to the first surface. The supporting component is fixed to the case in the case and supports the display. The display is fixed to the panel in the first surface and fixed to the supporting component in the second surface.

8 Claims, 18 Drawing Sheets

(51) Int. Cl.
*H05K 7/00* (2006.01)
*B06B 1/06* (2006.01)
*H04M 1/02* (2006.01)
*G06F 3/02* (2006.01)
*G06F 3/044* (2006.01)
*G06F 3/16* (2006.01)
*H04M 1/03* (2006.01)

(52) U.S. Cl.
CPC ........ *G06F 1/1643* (2013.01); *H04M 1/0266* (2013.01); *G06F 3/02* (2013.01); *G06F 3/044* (2013.01); *G06F 3/16* (2013.01); *H04M 1/03* (2013.01)

(58) Field of Classification Search
USPC ............... 361/679.21–679.3, 679.55, 679.56
See application file for complete search history.

(56) References Cited

U.S. PATENT DOCUMENTS

| | | | | |
|---|---|---|---|---|
| 7,558,054 | B1* | 7/2009 | Prest | H05K 5/0017 361/679.3 |
| 8,243,426 | B2* | 8/2012 | Chen | G02B 1/005 361/679.21 |
| 8,542,481 | B2* | 9/2013 | Lim | H05K 7/00 349/58 |
| 9,092,187 | B2* | 7/2015 | Kwong | G06F 1/1601 |
| 9,363,591 | B2 | 6/2016 | Ozasa et al. | |
| 9,369,553 | B2* | 6/2016 | Zahler | H04M 1/0266 |
| 9,377,912 | B2* | 6/2016 | Joyce | G06F 1/1637 |
| 9,398,734 | B2* | 7/2016 | Omura | H05K 13/04 |
| 9,407,746 | B2* | 8/2016 | Schmid | H04M 1/185 |
| 9,472,917 | B2* | 10/2016 | Jarvis | H01R 43/205 |
| 9,778,685 | B2* | 10/2017 | Sanford | G06F 1/1626 |
| 2001/0002145 | A1* | 5/2001 | Lee | G02F 1/133308 349/58 |
| 2011/0053653 | A1* | 3/2011 | Tho | H04M 1/0202 455/566 |
| 2012/0026662 | A1* | 2/2012 | Tanaka | G06F 1/1616 361/679.08 |
| 2013/0211265 | A1* | 8/2013 | Bedingham | G06F 19/3418 600/483 |
| 2015/0326967 | A1 | 11/2015 | Otani | |

FOREIGN PATENT DOCUMENTS

| | | |
|---|---|---|
| JP | 2007-300578 | 11/2007 |
| JP | 2013-131987 | 7/2013 |
| WO | WO 2013/047609 | 4/2013 |
| WO | WO 2013/175761 | 11/2013 |

OTHER PUBLICATIONS

Written Opinion of the International Searching Authority in international application No. PCT/JP2015/068220, dated Aug. 25, 2015, and Statement of Relevance of Non-English References Cited Therein, in 8 pages.

* cited by examiner

F I G . 8
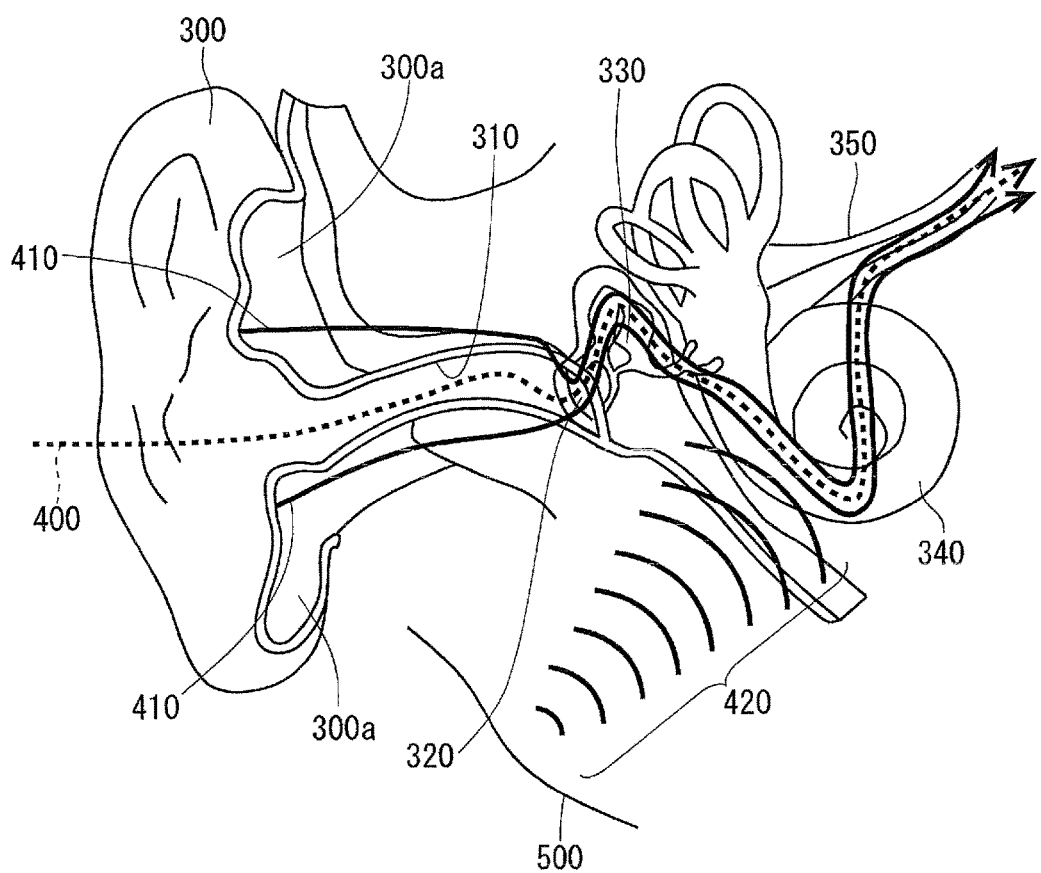

F I G . 2 4
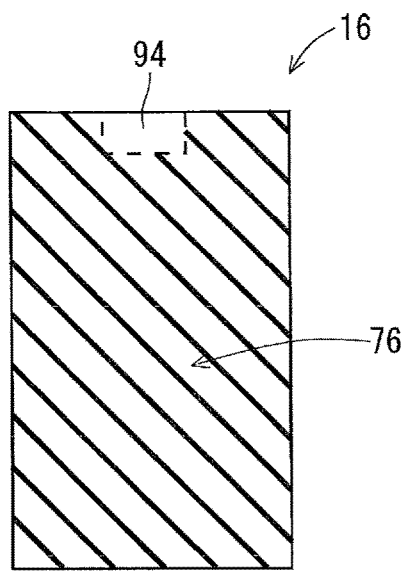
F I G . 2 5
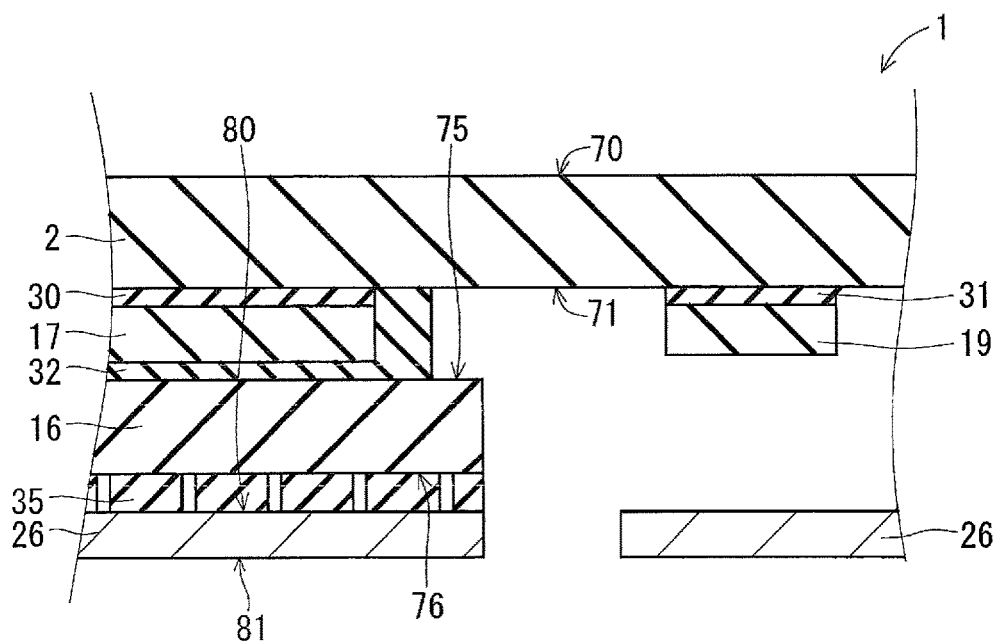

ELECTRONIC APPARATUS

CROSS-REFERENCE TO RELATED APPLICATION

The present application is a continuation based on PCT Application No. PCT/JP2015/068220 filed on Jun. 24, 2015, which claims the benefit of Japanese Application No. 2014-131405, filed on Jun. 26, 2014. PCT Application No. PCT/JP2015/068220 is entitled "ELECTRONIC APPARATUS", and Japanese Application No. 2014-131405 is entitled "ELECTRONIC APPARATUS". The contents of which are incorporated by reference herein in their entirety.

FIELD

Embodiments of the present disclosure relate to an electronic apparatus.

BACKGROUND

Various technologies have conventionally been proposed for electronic apparatuses.

SUMMARY

An electronic apparatus is disclosed. In one embodiment, an electronic apparatus comprises a case, a panel, a display, and a supporting component. The panel includes a layer of sapphire located on a surface of the electronic apparatus. The display comprises a first surface including a display screen and a second surface opposite to the first surface. The supporting component is fixed to the case in the case and supports the display. The display is fixed to the panel in the first surface and fixed to the supporting component in the second surface.

BRIEF DESCRIPTION OF THE DRAWINGS

FIG. 8 illustrates a view for describing air conduction sound and tissue conduction sound.

FIG. 24 illustrates the display.

FIG. 25 illustrates a cross-sectional view showing the electronic apparatus.

DETAILED DESCRIPTION

<<With Regard to Electronic Apparatus>>

First, a configuration of an electronic apparatus 1 that is common to a first embodiment to a third embodiment described below will be described.

<External Appearance of Electronic Apparatus>

Figure 1:
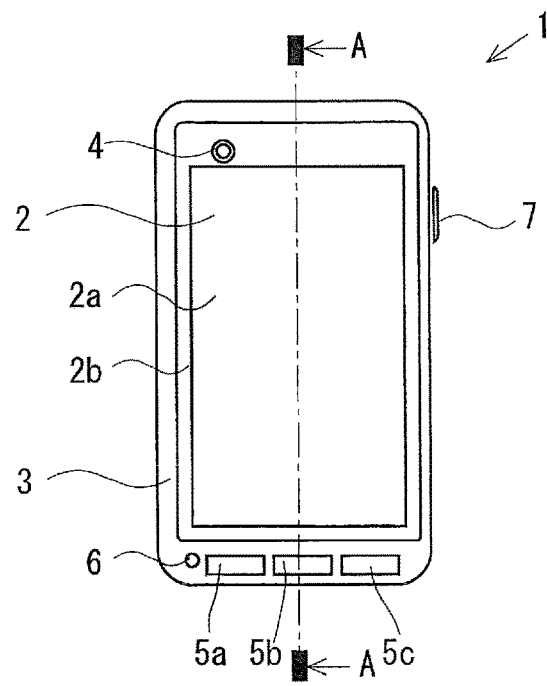
FIG. 1 illustrates a front view showing an external appearance of an electronic apparatus.
Figure 2:
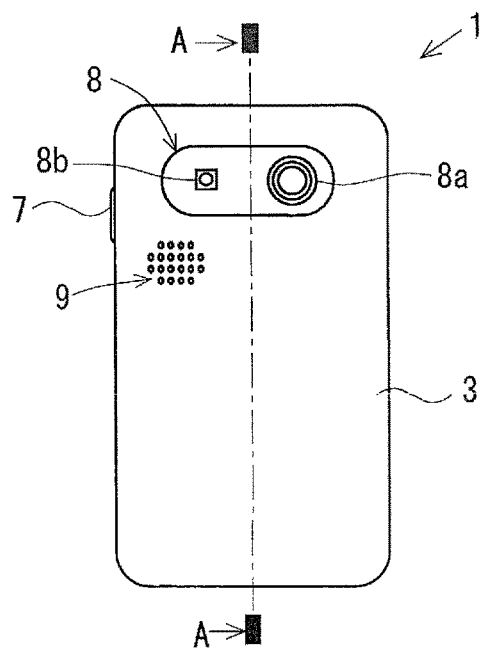
FIG. 2 illustrates a rear view showing the external appearance of the electronic apparatus.

FIGS. 1 and 2 respectively illustrate a front view and a rear view showing an external appearance of the electronic apparatus 1. The electronic apparatus 1 is, for example, a mobile phone such as a smartphone, and can communicate with another communication device via a base station, a server, or the like. As illustrated in FIGS. 1 and 2, the electronic apparatus 1 has a substantially rectangular plate shape in a plan view. As illustrated in FIGS. 1 and 2, a cover panel 2 and a case 3 form an exterior surface (front surface) of the electronic apparatus 1.

The cover panel 2 has a plate shape in the plan view. As illustrated in FIG. 1, the cover panel 2 forms an area of the front surface of the electronic apparatus 1 except for a peripheral area of the front portion of the electronic apparatus 1. The cover panel 2 comprises a first main surface 70 that forms part of the front surface of the electronic apparatus 1 and a second main surface 71 located opposite to the first main surface 70 (see FIGS. 9 and 10 described below). Hereinafter, the first main surface 70 may be referred to as an "outer main surface 70", and the second main surface 71 may be referred to as an "inner main surface 71".

The cover panel 2 is made of a transparent hard material. For example, sapphire is used as a material for the cover panel 2. Sapphire is harder than components of glass such as quartz, which is found in a considerable amount in the surface of the earth. Therefore, for example, in a case where sapphire is used as the material for the cover panel 2, the electronic apparatus 1 is resistant to scratches even when the electronic apparatus 1 is dropped outside. Here, sapphire refers to a monocrystal that contains alumina ($Al_2O_3$) as a main component, and herein, refers to a monocrystal having a purity of $Al_2O_3$ of approximately 90% or more. The purity of $Al_2O_3$ may be greater than or equal to 99% in order to further increase resistance to scratches and to more reliably eliminate or reduce cracks and chipping.

The cover panel 2 may be a panel of a single-layer structure that includes a layer of sapphire located on the surface of the electronic apparatus 1 or may be a composite panel (laminated panel) of a multilayer structure that includes the layer of sapphire. For example, the cover panel 2 may be a composite panel of a two-layer structure that includes a layer of sapphire (sapphire panel) located on the surface of the electronic apparatus 1 and a layer of glass (glass panel) attached to the layer of sapphire. The cover panel 2 may be a composite panel of a three-layer structure that includes the layer of sapphire (sapphire panel) located on the surface of the electronic apparatus 1, the layer of glass (glass panel) attached to the layer of sapphire, and a layer of sapphire (sapphire panel) attached to the layer of glass. The cover panel 2 may include a layer made of crystalline materials, except for sapphire, such as diamond, zirconia, titania, crystal, lithium tantalite, and aluminum oxynitride.

The crystalline materials such as sapphire and diamond are hard, but they are often resistant to deformation. For this reason, the cover panel 2 may break when being deformed. Accordingly, the configuration of the electronic apparatus 1 in which the cover panel 2 is less likely to break is described in the first embodiment to the third embodiment described below.

The cover panel 2 comprises a display area 2a and a peripheral area 2b. Various pieces of information such as characters, symbols, graphics, and videos displayed on a display 16, which will be described below, can be visually recognized by the user through the display area 2a of the cover panel 2. The peripheral area 2b of the cover panel 2 that surrounds the display area 2a is opaque and/or not transparent because of, for example, a film or the like that is attached thereto. A display on the peripheral area 2b by the display 16 is less likely to be visually recognized by the user.

A front imaging unit 4 is located in an upper-side end portion of the cover panel 2. A touch panel 17, which will be described below, is attached to the inner main surface 71 of the cover panel 2. The user can provide various instructions to the electronic apparatus 1 by operating the display area 2a of the cover panel 2 using the finger or the like.

The case 3 forms the peripheral area of the front surface of the electronic apparatus 1 and the side surfaces and the rear surface of the electronic apparatus 1. The case 3 is made of, for example, resin. The resin forming the case 3 may be, for example, a polycarbonate resin, an ABS resin, and a nylon resin.

An operation key 5a, an operation key 5b, an operation key 5c, and a microphone hole 6 are located in a lower-side end portion of the front surface of the electronic apparatus 1 in the case 3. Although the operation keys 5a to 5c are hardware keys in the electronic apparatus 1 illustrated in FIG. 1, each of the operation keys 5a to 5c may be achieved by a software key displayed on the display area 2a. The material for forming the operations keys 5a to 5c may be crystalline materials such as sapphire and diamond. Since the microphone hole 6 is difficult to be processed, the microphone hole 6 may not be located in the cover panel 2 and may be located in a portion other than the cover panel 2. For example, the microphone 6 may be located in the case 3. The microphone hole 6 may be located in the side surface or the rear surface of the case 3 such that a microphone in the case 3 does not pick up an operation sound particularly when the user operates the display area 2a during a telephone call.

A side key 7 that activates the electronic apparatus 1 is located on the side surface of the electronic apparatus 1. As illustrated in FIG. 2, a rear imaging unit 8 that includes an imaging device 8a and a lighting device 8b and speaker holes 9 are located in the rear surface of the electronic apparatus 1. The lighting device 8b is, for example, an LED. The lighting device 8b emits light serving as a flash when the imaging device 8a captures an image.

Hereinafter, an "upper side" and a "lower side" with regard to the electronic apparatus 1 respectively refer to an "upper side" and a "lower side" of the electronic apparatus 1 illustrated in FIG. 1. Further, a "right side" and a "left side" with regard to the electronic apparatus 1 respectively refer to a "right side" and a "left side" of the electronic apparatus 1 illustrated in FIG. 1.

<Electrical Configuration of Electronic Apparatus>

Figure 3:
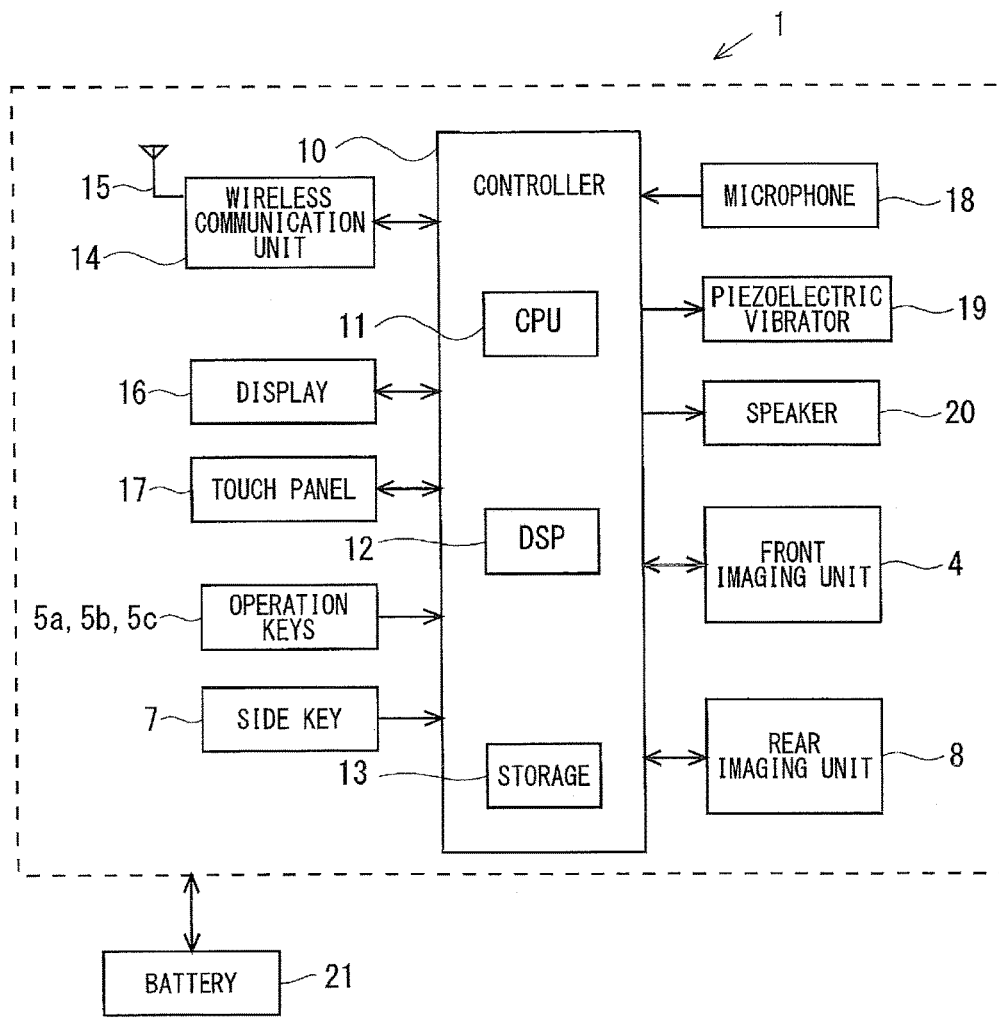
FIG. 3 illustrates a block diagram showing an electrical configuration of the electronic apparatus.

FIG. 3 illustrates a block diagram showing an electrical configuration of the electronic apparatus 1. As illustrated in FIG. 3, the electronic apparatus 1 includes a controller 10, a wireless communication unit 14, the display 16, the touch panel 17, the operation keys 5a to 5c, the side key 7, a microphone 18, a piezoelectric vibrator 19, a speaker 20, the front imaging unit 4, the rear imaging unit 8, and a battery 21. The case 3 of the electronic apparatus 1 accommodates the structural components of the electronic apparatus 1.

The controller 10 includes a Central Processing Unit (CPU) 11, a Digital Signal Processor (DSP) 12, and a storage 13. The controller 10 can manage the overall operation of the electronic apparatus 1 by controlling the other structural components of the electronic apparatus 1. The storage 13 includes a Read Only Memory (ROM) and a Random Access Memory (RAM). A main program, a plurality of application programs, and the like are stored in the storage 13, the main program being a control program for controlling the electronic apparatus 1, specifically, for controlling the respective structural components such as the wireless communication unit 14 and the display 16 of the electronic apparatus 1. Various functions of the controller 10 can be enabled by the CPU 11 and the DSP 12 executing various programs in the storage 13.

The wireless communication unit 14 includes an antenna 15. In the wireless communication unit 14, the antenna 15 can transmit and receive, via a base station, a communication signal to and from a mobile phone different from the electronic apparatus 1, or to and from a communication device such as a web server connected to the Internet.

The display 16 is, for example, a liquid crystal display or an organic electroluminescent (EL) display. Various pieces of information displayed on the display 16 can be visually recognized through the display area 2a from the outside of the electronic apparatus 1.

The touch panel 17 is, for example, a projection electrostatic capacitance touch panel. The touch panel 17 is attached to the inner main surface 71 of the cover panel 2. The touch panel 17 includes two sheet-shaped electrode sensors facing each other. When the user contacts the display area 2a with an operator such as a finger, capacitance of a portion of the touch panel 17 facing the operator is changed. Then, the touch panel 17 can output an electrical signal according to the change in the capacitance to the controller 10. In this manner, the touch panel 17 can detect the contact of the operator with the display area 2a.

The operation keys 5a to 5c and the side key 7 when being pressed can output an electrical instruction signal to the controller 10. A voice of the user during a telephone call is input to the microphone 18 that can convert the input sound into an electrical signal to output the electrical signal to the controller 10.

The piezoelectric vibrator 19 is attached to the inner main surface 71 of the cover panel 2. The piezoelectric vibrator 19 is configured to be vibrated by a drive voltage applied from the controller 10. The controller 10 generates a drive voltage based on a sound signal and applies the drive voltage to the piezoelectric vibrator 19. The piezoelectric vibrator 19 is configured to be vibrated by the controller 10 based on the sound signal, so that the cover panel 2 vibrates based on the sound signal. As a result, a reception sound is transmitted from the cover panel 2 to the user. The volume of the reception sound is set to a degree such that the user can appropriately hear the sound when moving the cover panel 2 close to an ear. The details of the piezoelectric vibrator 19 and the reception sound transmitted from the cover panel 2 to the user will be described below in detail.

Although the case in which the piezoelectric vibrator 19 transmits the reception sound from the cover panel 2 to the user is described below, a dynamic speaker that converts an electrical sound signal from the controller 10 into a sound to output the sound, for example, may be used instead of the piezoelectric vibrator 19. For the dynamic speaker, the cover panel 2 or the case 3 includes a receiver hole. The sound output from the dynamic speaker is output to the outside through the receiver hole located in the cover panel 2 or the case 3. The volume of the sound output through the receiver hole is lower than the volume of the sound output through the speaker holes 9.

The speaker 20 can convert the electrical sound signal input from the controller into a sound to output the sound, so that the speaker 20 can provide a ringer to the user at a location apart from the electronic apparatus 1. The front imaging unit 4 and the rear imaging unit 8 can capture still images and moving images. The battery 21 can output a power source for the electronic apparatus 1. The power source output from the battery 21 is supplied to the respective electronic components such as the controller 10 and the wireless communication unit 14 of the electronic apparatus 1.

<Details of Piezoelectric Vibrator>

Figure 4:
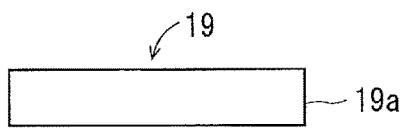
FIG. 4 illustrates a top view showing a structure of a piezoelectric vibrator.
Figure 5:
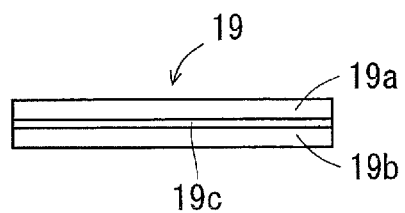
FIG. 5 illustrates a side view showing the structure of the piezoelectric vibrator.

FIGS. 4 and 5 respectively illustrate a top view and a side view showing a structure of the piezoelectric vibrator 19. As illustrated in FIGS. 4 and 5, the piezoelectric vibrator 19 has a long shape in one direction. Specifically, the piezoelectric vibrator 19 has a long and narrow rectangular shape in a plan view. The piezoelectric vibrator 19 has, for example, a bimorph structure. The piezoelectric vibrator 19 includes a first piezoelectric ceramic plate 19a and a second piezoelectric ceramic plate 19b which are bonded to each other with a shim material 19c therebetween. The piezoelectric vibrator that includes the first piezoelectric ceramic plate 19a and the second piezoelectric ceramic plate 19b is used in one embodiment, but the configuration of the piezoelectric vibrator is not limited to this specific example. For example, a piezoelectric vibrator that includes piezoelectric plates made of an organic piezoelectric material such as polyvinylidene fluoride and polylactic acid may be used.

In the piezoelectric vibrator 19, when a positive voltage is applied to the first piezoelectric ceramic plate 19a and a negative voltage is applied to the second piezoelectric ceramic plate 19b, the first piezoelectric ceramic plate 19a extends along the longitudinal direction and the second piezoelectric ceramic plate 19b contracts along the longitudinal direction. Accordingly, as illustrated in FIG. 6, the piezoelectric vibrator 19 is bent into a convex shape with the first piezoelectric ceramic plate 19a being the outside.

In contrast, in the piezoelectric vibrator 19, when a negative voltage is applied to the first piezoelectric ceramic plate 19a and a positive voltage is applied to the second piezoelectric ceramic plate 19b, the first piezoelectric ceramic plate 19a contracts along the longitudinal direction and the second piezoelectric ceramic plate 19b extends along the longitudinal direction. Accordingly, as illustrated in FIG. 7, the piezoelectric vibrator 19 is bent into a convex shape with the second piezoelectric ceramic plate 19b being the outside.

Figure 6:
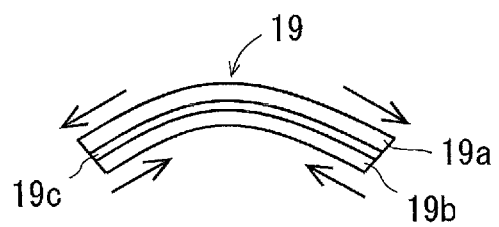
FIG. 6 illustrates how the piezoelectric vibrator vibrates while being bent.
Figure 7:
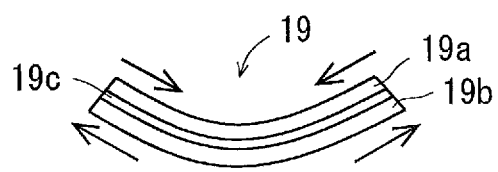
FIG. 7 illustrates how the piezoelectric vibrator vibrates while being bent.

The piezoelectric vibrator 19 vibrates while being bent along the longitudinal direction by alternately taking the state of FIG. 6 and the state of FIG. 7. The controller 10 allows the piezoelectric vibrator 19 to vibrate while being bent along the longitudinal direction by applying an alternating current (AC) voltage in which the positive voltage and the negative voltage alternately appear at an area between the first piezoelectric ceramic plate 19a and the second piezoelectric ceramic plate 19b.

The piezoelectric vibrator 19 illustrated in FIGS. 4 to 7 has only one structure made of the first piezoelectric ceramic plate 19a and the second piezoelectric ceramic plate 19b, which are bonded to each other with the shim material 19c therebetween. Alternatively, a plurality of the structures may be laminated to each other.

The piezoelectric vibrator 19 having such a structure is disposed on the peripheral end portion of the inner main surface 71 of the cover panel 2. Specifically, the piezoelectric vibrator 19 is disposed on a central portion in a short-length direction (horizontal direction) in an upper-side end portion of the inner main surface 71 of the cover panel 2. The piezoelectric vibrator 19 is disposed such that the longitudinal direction thereof extends along the short-length direction of the cover panel 2. In this manner, the piezoelectric vibrator 19 vibrates while being bent along the short-length direction of the cover panel 2. Further, the center in the longitudinal direction of the piezoelectric vibrator 19 corresponds to the center in the short-length direction of the upper-side end portion of the inner main surface 71 of the cover panel 2.

As illustrated in FIGS. 6 and 7 mentioned above, the center in the longitudinal direction of the piezoelectric vibrator 19 has the largest displacement amount when the piezoelectric vibrator 19 is vibrating while being bent. Therefore, an area in the center in the short-length direction in the upper-side end portion of the inner main surface 71 of the cover panel 2, which corresponds to the position of the piezoelectric vibrator 19, has the largest displacement amount of bending and vibrating.

<Generation of Reception Sound>

In the electronic apparatus 1, the piezoelectric vibrator 19 causes the cover panel 2 to vibrate, so that air conduction sound and tissue conduction sound are transmitted from the cover panel 2 to the user. In other words, a vibration of the piezoelectric vibrator 19 itself is transmitted to the cover panel 2, so that the air conduction sound and the tissue conduction sound are transmitted from the cover panel 2 to the user.

Here, the term "air conduction sound" is a sound recognized in the human brain by the vibrations of an eardrum due to a sound wave (air vibration) which enters an external auditory meatus hole (a so-called "ear hole"). On the other hand, the term "tissue conduction sound" is a sound recognized in the human brain by the vibrations of the eardrum due to the vibration of an auricle transmitted to the eardrum. Hereinafter, the air conduction sound and the tissue conduction sound will be described in detail.

FIG. 8 is a view for describing the air conduction sound and the tissue conduction sound. FIG. 8 illustrates the structure of the ear of the user of the electronic apparatus 1. In FIG. 8, a dotted line 400 indicates a conduction path of a sound signal (sound information) while the air conduction sound is recognized in the human brain. A solid line 410 indicates a conduction path of a sound signal while the tissue conduction sound is recognized in the human brain.

When the piezoelectric vibrator 19 mounted on the cover panel 2 vibrates based on the electric sound signal indicating the reception sound, the cover panel 2 vibrates, and a sound wave is output from the cover panel 2. When the user moves the cover panel 2 of the electronic apparatus 1 to an auricle 300 of the user by holding the electronic apparatus 1 in a hand, or the cover panel 2 of the electronic apparatus 1 is set to (brought into contact with) the auricle 300 of the user, the sound wave output from the cover panel 2 enters an external auditory meatus hole 310. The sound wave from the cover panel 2 travels through the external auditory meatus hole 310 and causes an eardrum 320 to vibrate. The vibration of the eardrum 320 is transmitted to an auditory ossicle 330 and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350 and the reception sound is recognized in the human brain. In this manner, the air conduction sound is transmitted from the cover panel 2 to the user.

Further, when the user puts the cover panel 2 of the electronic apparatus 1 to the auricle 300 of the user by holding the electronic apparatus 1 in a hand, the auricle 300 is vibrated by the cover panel 2, which is vibrated by the piezoelectric vibrator 190. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain through the acoustic nerve 350 and the reception sound is recognized in the brain. In this manner, the tissue conduction sound is transmitted from the cover panel 2 to the user. FIG. 8 also illustrates an auricle cartilage 300a in the inside of the auricle 300.

Bone conduction sound is a sound recognized in the human brain by the vibration of the skull and direct stimulation of the inner ear such as the cochlea caused by the vibration of the skull. In FIG. 8, in a case where a jawbone 500 vibrates, the transmission path of the sound signal while the bone conduction sound is recognized in the brain is indicated by a plurality of arcs 420.

As described above, the air conduction sound and the tissue conduction sound can be transmitted from the cover panel 2 to the user of the electronic apparatus 1 due to an appropriate vibration of the cover panel 2 being the front surface through the vibration of the piezoelectric vibrator 19. The user can hear the air conduction sound from the cover panel 2 by moving the cover panel 2 close to an ear (auricle). Further, the user can hear the air conduction sound and the tissue conduction sound from the cover panel 2 by bringing the cover panel 2 into contact with an ear (auricle). The structure of the piezoelectric vibrator 19 according to one embodiment is contrived to appropriately transmit the air conduction sound and the tissue conduction sound to the user. Various advantages are achieved by forming the electronic apparatus 1 to transmit the air conduction sound and the tissue conduction sound to the user.

For example, since the user can hear a sound when putting the cover panel 2 to the ear, communication using the electronic apparatus 1 can be performed without much concerning of the position of the electronic apparatus 1 with respect to the ear.

If there is a large amount of ambient noise, the user can make it difficult to hear the ambient sound by strongly putting the cover panel 2 to the ear while turning up the volume of the tissue conduction sound. Accordingly, the user can appropriately perform communication even when there is a large amount of the ambient noise.

In addition, even with earplugs or earphones on his/her ears, the user can recognize the reception sound from the electronic apparatus 1 by putting the cover panel 2 to the ear (more specifically, the auricle). Further, even with headphones on his/her ears, the user can recognize the reception sound from the electronic apparatus 1 by putting the cover panel 2 to the headphones.

First Embodiment

Cross-Sectional View of Electronic Apparatus

Figure 9:
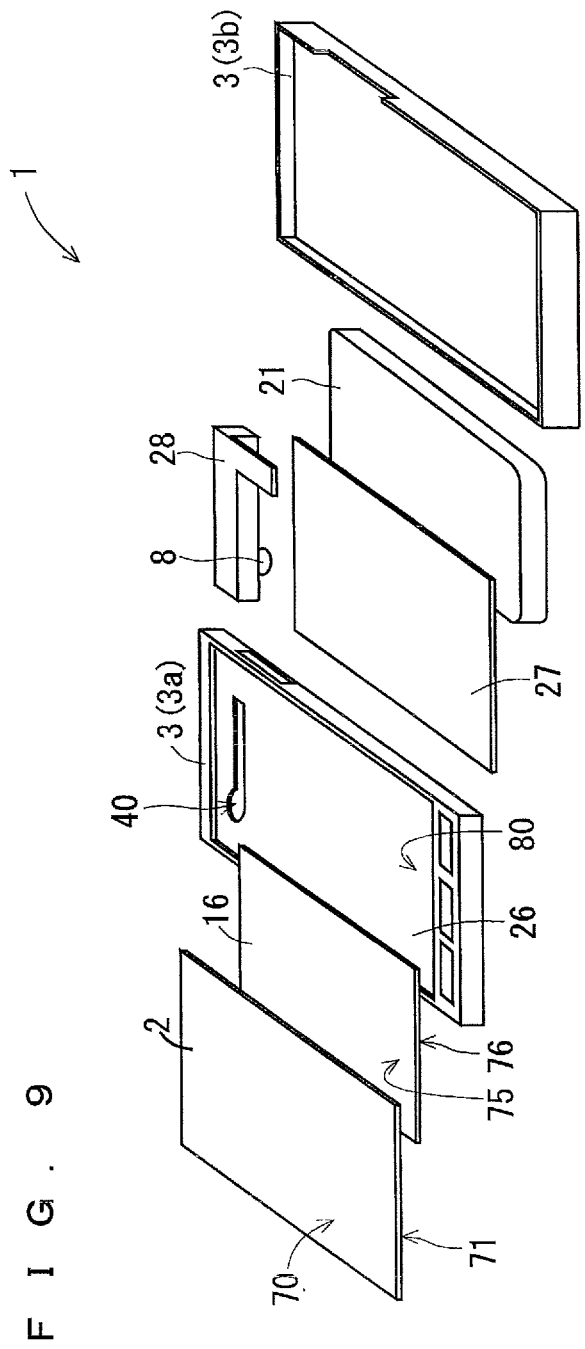
FIG. 9 illustrates an exploded perspective view showing the electronic apparatus.
Figure 10:
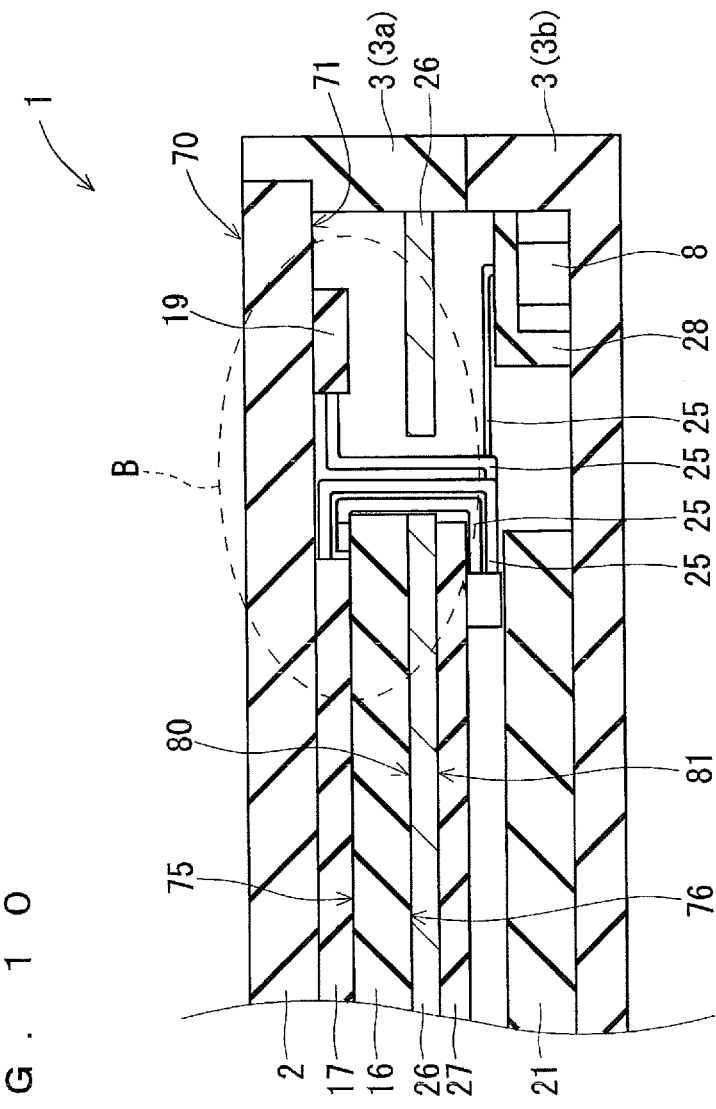
FIG. 10 illustrates a cross-sectional view showing the electronic apparatus.
Figure 11:
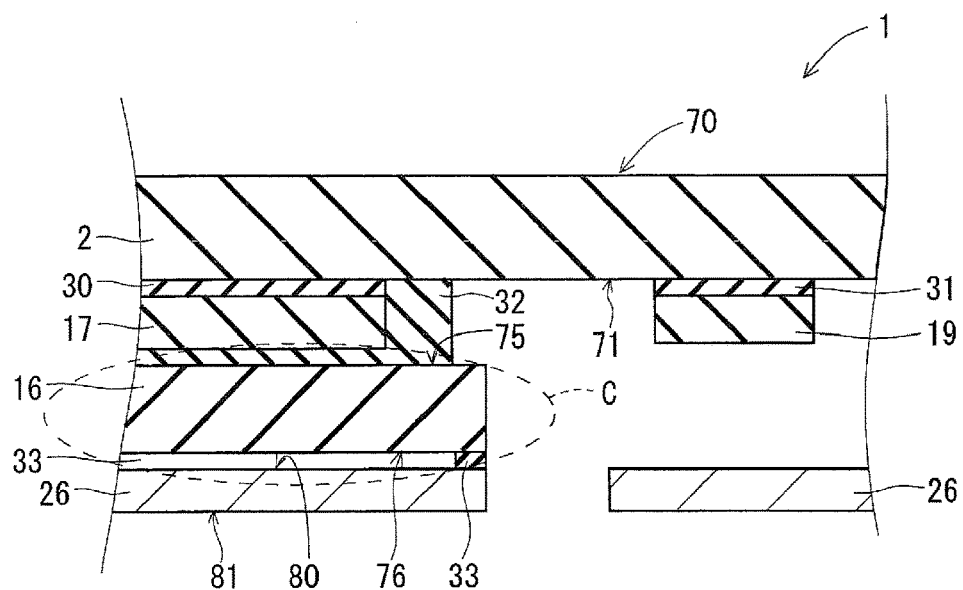
FIG. 11 illustrates a cross-sectional view showing the electronic apparatus.

Herein, the configuration of the electronic apparatus 1 in which the cover panel 2 is less likely to break will be described. FIG. 9 illustrates an exploded perspective view showing the electronic apparatus 1 according to a first embodiment. FIG. 10 illustrates a cross-sectional view showing the electronic apparatus 1 taken along an A-A line illustrated in FIGS. 1 and 2. FIG. 11 illustrates an enlarged view of a portion B illustrated in FIG. 10. In FIGS. 9 and 11, part of components of the electronic apparatus 1 such as a plurality of cables (wires) 25 (see FIG. 10) that electrically connect a plurality of electronic components to each other is omitted for the sake of brevity.

As illustrated in FIGS. 9 and 10, the case 3 of the electronic apparatus 1 includes a front case 3a and a back case 3b. The front case 3a and the back case 3b form the surface of the electronic apparatus 1. More specifically, the front case 3a has a frame shape and forms the peripheral area of the front surface of the electronic apparatus 1 and part of the side surfaces of the electronic apparatus 1. The back case 3b has a substantially box shape with one main surface open and forms part of the side surfaces of the electronic apparatus 1 and the rear surface of the electronic apparatus 1. The front case 3a and the back case 3b are joined to each other by being fixed with hooks or fastened with screws to accommodate various structural components such as the display 16 of the electronic apparatus 1. Although the case 3 includes the front case 3a and the back case 3b, the case 3 may be formed of only one member or a combination of three or more members.

As illustrated in FIGS. 9 and 10, a supporting component 26 that supports the display 16 is fixed to the inside of the front case 3a. The supporting component 26 has, for example, a plate shape. The supporting component 26 is made of, for example, a metal material such as stainless steel. Since the supporting component 26 is fixed to the case 3, the supporting component 26 has high rigidity. The supporting component 26 may include an opening 40. The opening 40 is located in a position to allow the cables to pass therethrough, in a position that does not interfere with arrangement of the electronic component of the electronic apparatus 1 such as the front imaging unit 4, or in a position where metal (being the material for the supporting component 26) does not interfere with the performance of the antenna 15.

The supporting component 26 may be formed separately from the case 3 and fixed to the case 3 in the assembly of the electronic apparatus 1, or may be formed integrally with the case 3 by an insert molding. The supporting component 26 is fixed to the front case 3a, but the supporting component 26 may be fixed to the back case 3b.

As illustrated in FIG. 10, the peripheral area of the inner main surface 71 of the cover panel 2 is fixed to the front case 3a. The cover panel 2 and the front case 3a are fixed to each other with a double-sided tape or an adhesive. The touch panel 17 and the piezoelectric vibrator 19 are fixed to the inner main surface 71 of the cover panel 2. More specifically, as illustrated in FIG. 11, the touch panel 17 is fixed to the cover panel 2 with a bonding material 30 such as the double-sided tape or and the adhesive. Similarly, the piezoelectric vibrator 19 is fixed to the cover panel 2 with a bonding material 31 such as the double-sided tape and the adhesive.

The display 16 is disposed so as to face the surface of the touch panel 17 opposite to the surface of the touch panel 17 that faces the cover panel 2. As illustrated in FIG. 11, the cover panel 2 and the touch panel 17 are fixed to a first main surface 75 of the display 16 with a bonding material 32 such as the double-sided tape and the adhesive. In addition, a main surface of the display 16 opposite to the first main surface 75 is referred to as a second main surface 76. The first main surface 75 of the display 16 may be referred to as a "front-side main surface 75". The second main surface 76 of the display 16 may be referred to as a "rear-side main surface 76".

The rear-side main surface 76 of the display 16 is fixed to a first main surface 80 of the supporting component 26 with a bonding material 33 such as the double-sided tape and the adhesive. The supporting component 26 comprises the first main surface 80 and a second main surface 81 opposite to the first main surface 80. The first main surface 80 of the supporting component 26 may be referred to as a "front-side main surface 80". The second main surface 81 of the supporting component 26 may be referred to as a "rear-side main surface 81". Since the touch panel 17 is fixed to the cover panel 2 and the display 16 is fixed to the touch panel 17, it can be said that the supporting component 26 that supports the display 16 supports the cover panel 2 with the display 16 and the touch panel 17 therebetween. The rigidity of the touch panel 17, the display 16, and the supporting component 26 makes the cover panel 2 less likely to be deformed (bent) inwardly (in a direction from the outer main surface 70 toward the inner main surface 71). As a result, the cover panel 2 is less likely to break.

Further, the rear-side main surface 76 of the display 16 is fixed to the front-side main surface 80 of the supporting component 26, so that the cover panel 2 is less likely to be deformed (bent) outwardly (in a direction from the inner main surface 71 toward the outer main surface 70). As a result, the cover panel 2 is less likely to break.

As illustrated in FIGS. 9 and 10, a printed circuit board 27 on which various components such as the CPU 11 and the DSP 12 are installed is disposed so as to face the rear-side main surface 81 of the supporting component 26. The battery 21 is disposed so as to face the printed circuit board 27. The back case 3b is disposed so as to face the battery 21.

<With Regard to Display>

Figure 12:
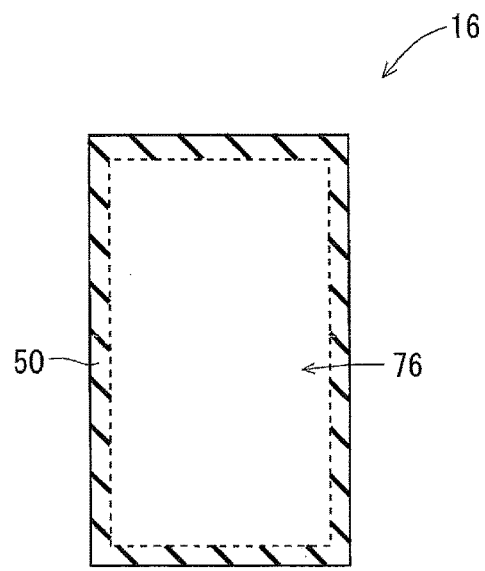
FIG. 12 illustrates a display.

FIG. 12 illustrates the rear-side main surface 76 of the display 16. FIG. 12 indicates an area of the rear-side main surface 76 fixed to the supporting component 26 by diagonal lines to the upper left. As illustrated in FIG. 12, the display 16 is fixed to the supporting component 26 in a peripheral area 50 of the rear-side main surface 76.

Figure 13:
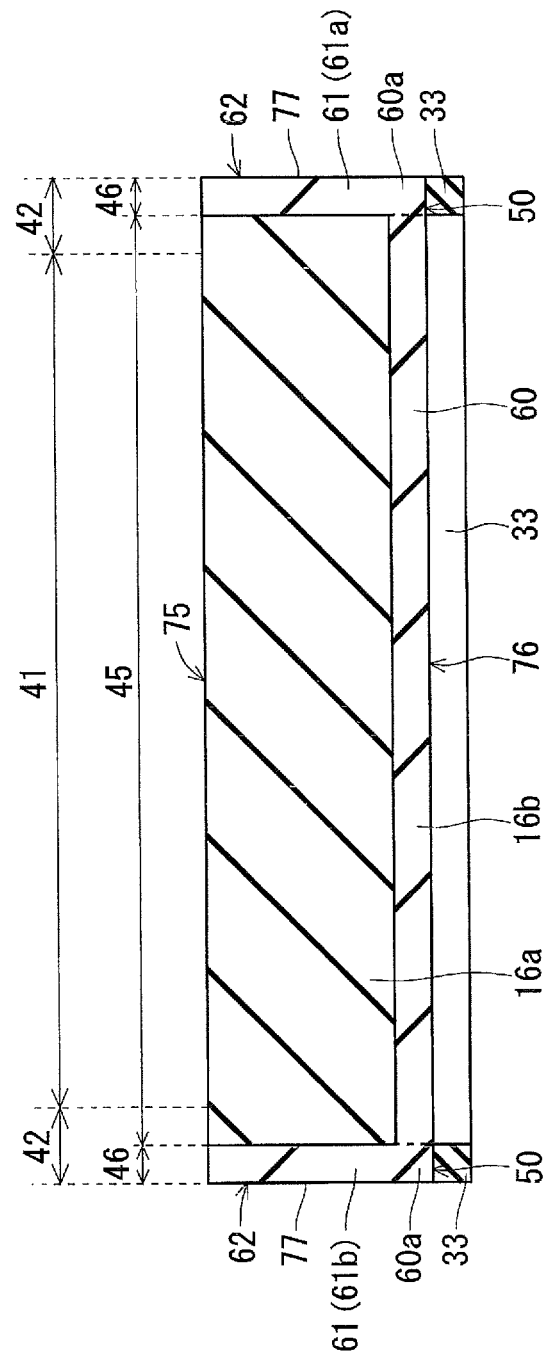
FIG. 13 illustrates a cross-sectional view showing the display and a bonding material.

FIG. 13 illustrates an enlarged view of a portion C in FIG. 11. FIG. 13 illustrates the display 16 and the bonding material 33. The display 16 illustrated in FIG. 13 includes a display portion 16a and a display case 16b. The display case 16b having a box shape with an upper surface open accommodates the display portion 16a.

The display portion 16a includes a plurality of components needed for displaying various pieces of information such as characters, symbols, graphics, and videos. For example, in a case where a liquid crystal display is used as the display 16, the display portion 16a includes a plurality of components such as a backlight and a liquid crystal panel. In contrast, the display case 16b is a component that protects the display portion 16a. The display case 16b is made of, for example, a metal material such as stainless steel. Thus, the display portion 16b has strength higher than that of the display portion 16a.

The front-side main surface 75 of the display 16 is formed by the display portion 16a and the display case 16b. More specifically, the peripheral area of the front-side main surface 75 is formed by the display case 16b, and the area of the front-side main surface 75 except for the peripheral area thereof is formed by the display portion 16a. The area of the front-side main surface 75 formed by the display portion 16a is referred to as a "first area 45". The area of the front-side main surface 75 formed by the display case 16b is referred to as a "second area 46".

The area of the front-side main surface 75 of the display 16 on which the various pieces of information are displayed is referred to as a "display area 41". The display area 41 is also referred to as a "display screen 41". In contrast, the area of the front-side main surface 75 of the display 16 except for the display area 41 is referred to as a "non-display area 42". In the display 16 illustrated in FIG. 13, the peripheral area of the first area 45 formed by the display portion 16a is the non-display area 42. In other words, a display is not performed on the peripheral area of the first area 45.

The rear-side main surface 76 and four side surfaces 77 of the display 16 are formed by the display case 16b. As illustrated in FIG. 13, the display case 16b comprises a bottom portion 60 forming the rear-side main surface 76 of the display 16 and four side wall portions 61 located upright on the bottom portion 60. FIG. 13 illustrates the bottom portion 60, an upper-side wall portion 61a extending from the upper-side end portion (right-side end portion in FIG. 13) of the bottom portion 60, and a lower-side wall portion 61b extending from the lower-side end portion (left-side end portion in FIG. 13) of the bottom portion 60. The display case 16b also comprises a left-side wall portion extending from the left-side end portion of the bottom portion 60 and a right-side wall portion extending from the right-side end portion of the bottom portion 60, which are not illustrated in FIG. 13. The bottom portion 60 of the display case 16b covers the bottom surface of the display portion 16a, and the side wall portions 61 of the display case 16b cover the side surfaces of the display portion 16a.

As illustrated in FIG. 13, the four side wall portions 61 are located on the peripheral area 50 of the rear-side main surface 76 of the display 16. In the display 16, a portion that includes a peripheral portion 60a of the bottom portion 60 and the four side wall portions 61 on the peripheral portion 60a is referred to as a peripheral end portion 62 of the display 16. A rear surface of the peripheral portion 60a of the bottom portion 60 is the peripheral area 50 of the rear-side main surface 76.

As described above, the display 16 is fixed to the supporting component 26 in the peripheral area 50 of the rear-side main surface 76. In other words, the peripheral end portion 62 of the display 16 is fixed to the supporting component 26. Thus, force is easily applied to the peripheral end portion 62 of the display 16 when the force is applied to the surface of the electronic apparatus 1 in the thickness direction of the electronic apparatus 1 by, for example, an operation on the display area 2a of the electronic apparatus 1 by the user.

However, the peripheral end portion 62 does not include the display portion 16a in the display 16. That is to say, the peripheral end portion 62 to which the force is easily applied does not include the display area (display screen) 41. Therefore, even when the force is applied to the front-side main surface 75 of the display 16 by the operation on the display area 2a of the electronic apparatus 1 by the user, the display on the display 16 is less likely to be distorted. Further, even when the peripheral end portion 62 to which the supporting component 26 is fixed includes part of the display portion 16a, only the display at the end of the display area 41 is distorted, so that visibility of the display is not much degraded.

The peripheral end portion 62 of the display 16 includes the side wall portions 61 of the display case 16b having high strength. Since the side wall portions 61 extend in the thickness direction of the electronic apparatus 1, the peripheral end portion 62 to which the force is easily applied is less likely to be deformed even when the force is applied to the surface of the electronic apparatus 1 in the thickness direction of the electronic apparatus 1. Thus, the display 16 is less likely to be deformed (bent), so that the distortion of the display on the display 16 can be suppressed.

As described above, the display 16 is fixed to the supporting component 26 in the electronic apparatus 1 (see FIG. 11). Thus, the display 16 is hardly separated from the supporting component 26, and the cover panel 2 fixed to the display 16 is less likely to be deformed outwardly. As a result, the cover panel 2 can be less likely to break.

Since the supporting component 26 is fixed to the case 3, the supporting component 26 has high rigidity. In other words, the cover panel 2 has rigidity increased by being fixed to the supporting component 26 with the display 16 therebetween. Thus, the cover panel 2 is less likely to be deformed. Also from this point of view, it can thus be said that the cover panel 2 is less likely to break.

First Modification of First Embodiment

Figure 14:
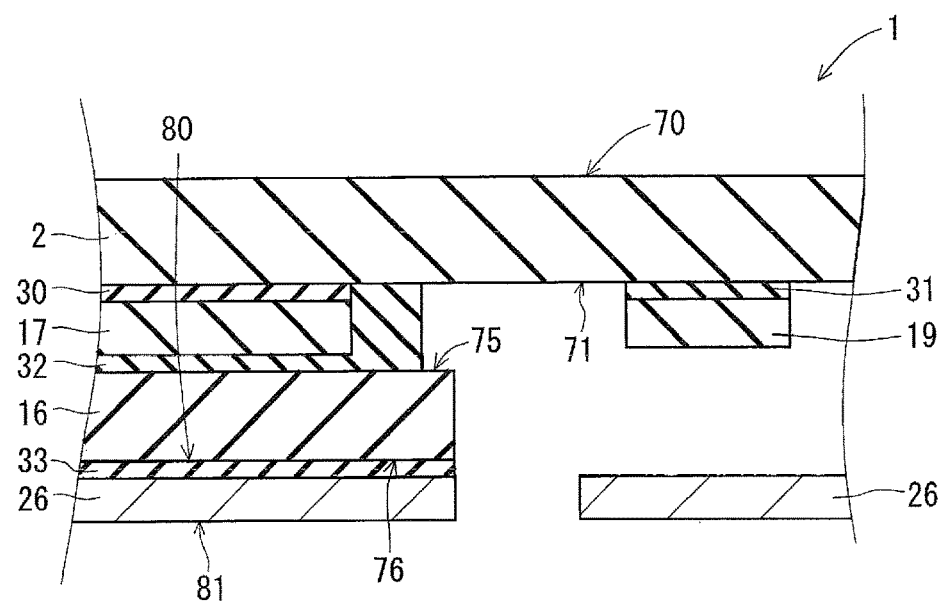
FIG. 14 illustrates a cross-sectional view showing the electronic apparatus.
Figure 15:
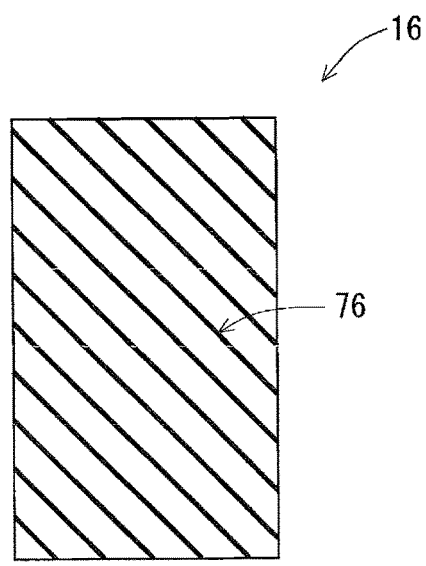
FIG. 15 illustrates the display.

The display 16 according to the first embodiment is fixed to the supporting component 26 in the peripheral area 50 of the rear-side main surface 76 (see FIG. 11). Nevertheless, the display 16 and the supporting component 26 may be fixed to each other in a manner illustrated in FIGS. 14 and 15. FIG. 14 illustrates a cross-sectional view showing the electronic apparatus 1 and corresponds to FIG. 11. FIG. 15 illustrates the rear-side main surface 76 of the display 16 and corresponds to FIG. 12.

As illustrated in FIGS. 14 and 15, the entire area of the rear-side main surface 76 of the display 16 is fixed to the front-side main surface 80 of the supporting component 26 with the bonding material 33 in the electronic apparatus 1 according to one modification. In other words, the display 16 is fixed to the supporting component 26 in the wider area in the electronic apparatus 1 according to one modification than the electronic apparatus 1 according to the first embodiment. Thus, the cover panel 2 can be less likely to be deformed outwardly in the electronic apparatus 1 according to one modification than the electronic apparatus 1 according to the first embodiment illustrated in FIGS. 11 and 12.

However, since the entire area of the rear-side main surface 76 of the display 16 is fixed to the supporting component 26 with the bonding material 33 in the electronic apparatus 1 according to one modification, the force is easily applied to the entire surface of the display 16 when applied to the surface of the electronic apparatus 1 in the thickness direction of the electronic apparatus 1. Therefore, the distortion of the display on the display 16 when the force is applied to the surface of the electronic apparatus 1 in the thickness direction of the electronic apparatus 1 is further reduced in the electronic apparatus 1 according to the first embodiment.

Second Modification of First Embodiment

Figure 16:
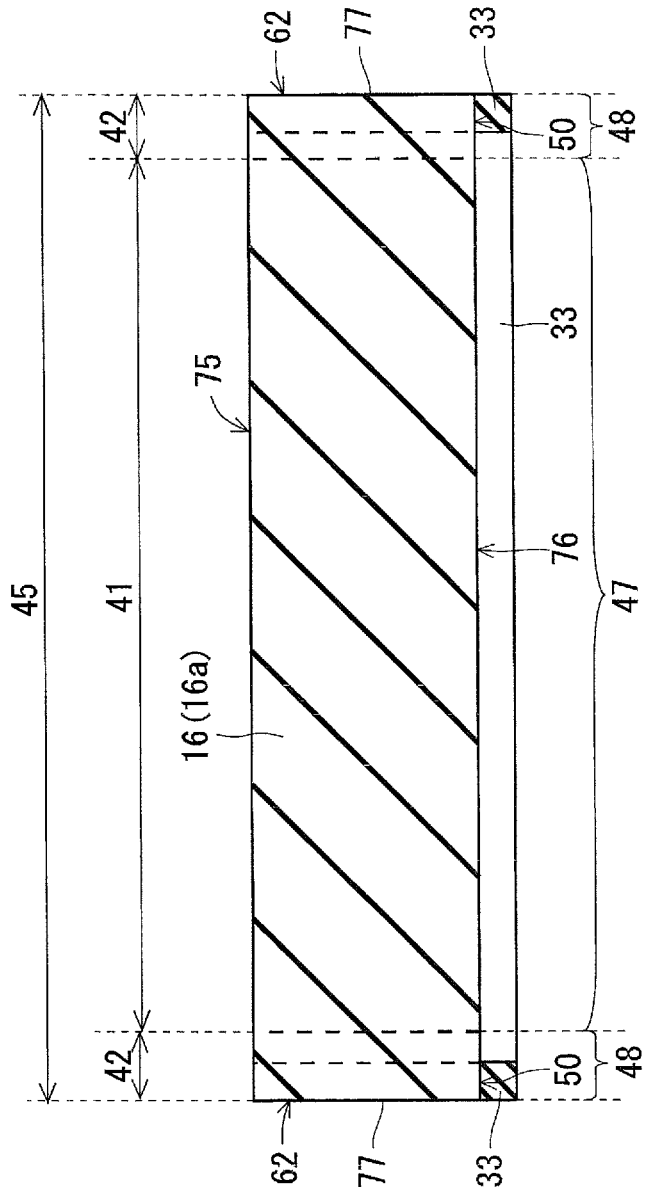
FIG. 16 illustrates a cross-sectional view showing the display and the bonding material.
Figure 17:
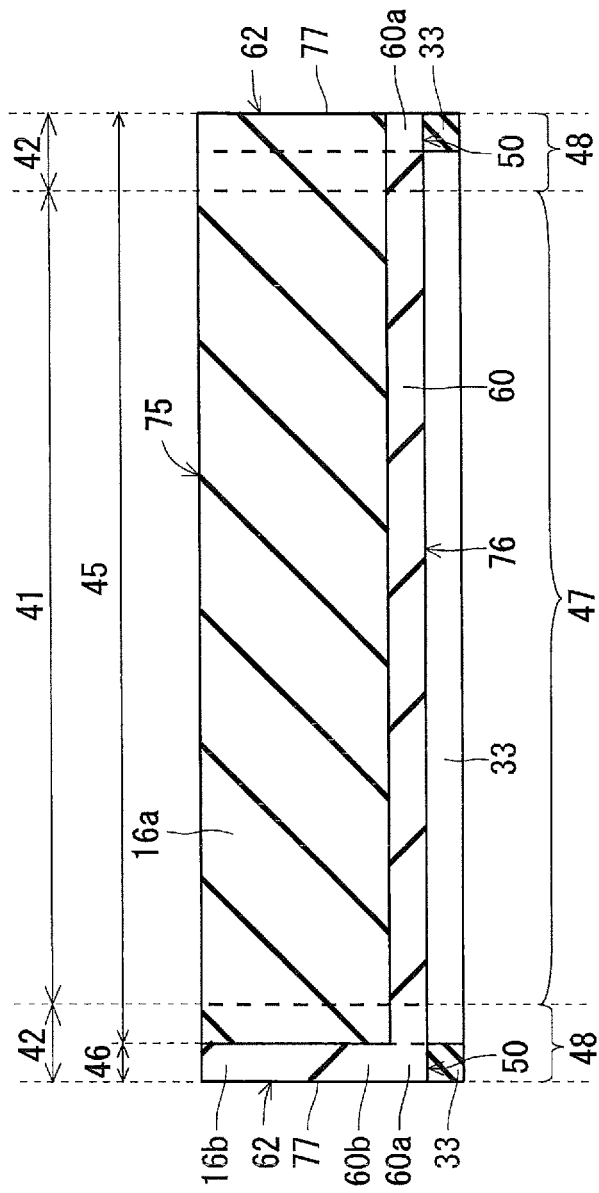
FIG. 17 illustrates a cross-sectional view showing the display and the bonding material.

The display case 16b of the box shape accommodates the display portion 16a in the display 16 according to the first embodiment. Nevertheless, the display 16 illustrated in FIGS. 16 and 17 may be used. FIGS. 16 and 17 both illustrate a cross-sectional view showing the display 16 and correspond to FIG. 13.

The display 16 does not include the display case 16b in one example illustrated in FIG. 16. In other words, the display 16 is formed by the display portion 16a. Thus, the peripheral end portion 62 of the display 16 is formed by the display portion 16a. The peripheral area of the front-side main surface 75 of the display 16 is the non-display area 42, and the area of the front-side main surface 75 except for the non-display area 42 thereof is the display area 41. In addition, the peripheral end portion 62 of the display 16 does not include the display area 41.

For example, in a case where the liquid crystal display is used as the display 16 (display portion 16a) herein, light emitted from the backlight located below the display area 41 in the display portion 16a passes through the components such as the liquid crystal panel and reaches the display area 41. The liquid crystal panel adjusts an amount of transmitted light that passes through the liquid crystal panel according to an input image signal input to the display 16 from the controller 10. Accordingly, the image is displayed on the display area 41 of the display 16. Here, a portion of the display portion 16a below the display area 41 through which the light emitted from the backlight toward the display area 41 passes is referred to as a "light guide portion 47". A portion of the display portion 16a except for the light guide portion 47, namely, a portion of the display portion 16a below the non-display area 42 is referred to as a "non-light guide portion 48".

When the force is applied to the light guide portion 47 by an input operation performed on the electronic apparatus 1 by the user, part of the components, such as the backlight and the liquid crystal panel, that serves as the light guide portion 47 may be deformed. When the light guide portion 47 is deformed, the traveling direction of the light emitted from the backlight and the amount of transmitted light in the liquid crystal panel are easily changed. The changes in the traveling direction of the light emitted from the backlight and the amount of transmitted light in the liquid crystal panel cause the distortion of the display on the display area 41 (display 16).

In contrast to the display case 16b, the display portion 16a has low strength. Thus, when the force is applied to the non-light guide portion 48, not only the non-light guide portion 48 but also the light guide portion 47 may be deformed. However, the amount of deformation of the light guide portion 47 when the force is applied to the non-light guide portion 48 is smaller than the amount of deformation of the light guide portion 47 when the force is applied to the light guide portion 47. Consequently, when the force is applied to the non-light guide portion 48, the display on the display area 41 (display 16) is less likely to be distorted than when the force is applied to the light guide portion 47.

In one example illustrated in FIG. 16, the display portion 16a forms the peripheral end portion 62 to which the force is easily applied when the force is applied to the front-side main surface 75 of the display 16, but the peripheral end portion 62 does not include the light guide portion 47. Thus, even in the case where the display 16 does not include the display case 16b as in one modification, the distortion of the display on the display 16 can be reduced while the peripheral area 50 of the rear-side main surface 76 of the display 16 and the supporting component 26 are fixed to each other.

In a case where the entire surface of the front-side main surface 75 of the display 16 (display portion 16a) is the display area 41, which is different from the display 16 exemplified in FIG. 16, the force is applied to the light guide portion 47 when applied to the surface of the electronic apparatus 1 in the thickness direction of the electronic apparatus 1. In this case, the display on an area of the display area 41 included in the peripheral end portion 62 (namely, the peripheral area of the display area 41) is more likely to be distorted. Nevertheless, the distortion of the display on the peripheral area of the display area 41 is less recognizable by the user than the distortion of the display on the central area of the display area 41, so that the visibility of the display is not much degraded.

In one example illustrated in FIG. 17, the display portion 16a and the display case 16b form the display 16. In contrast to the display case 16b of the first embodiment comprising the four side wall portions 61, however, the display case 16b according to one modification comprises three side wall portions 61. More specifically, as illustrated in FIG. 17, the display case 16b according to one modification does not comprise the upper-side wall portion 61a that extends from the upper-side end portion of the bottom portion 60 of the display 16.

Even in a case where the display 16 illustrated in FIG. 17 is used for the electronic apparatus 1, however, the peripheral end portion 62 to which the force is easily applied when the force is applied to the front-side main surface 75 of the display 16 does not include the light guide portion 47. Thus, even when the display 16 and the supporting component 26 are fixed to each other, the display on the display 16 can be less affected.

In addition, the display 16 according to one modification may be applied to the first modification of the first embodiment.

Third Modification of First Embodiment

Figure 18:
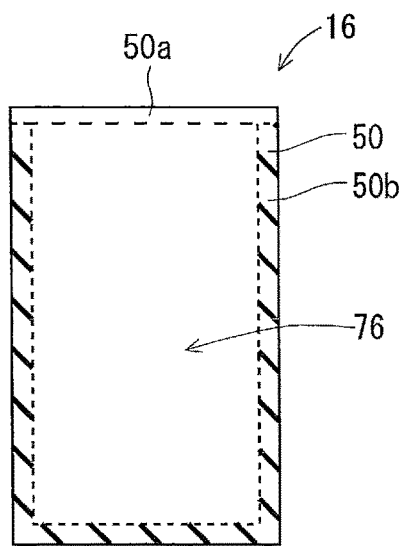
FIG. 18 illustrates the display.

In the first embodiment, the entire area of the peripheral area 50 of the rear-side main surface 76 of the display is fixed to the supporting component 26. However, the entire area of the peripheral area 50 does not need to be fixed to the supporting component 26. FIG. 18 illustrates the rear-side main surface 76 of the display 16 and corresponds to FIG. 12.

As illustrated in FIG. 18, an upper-side end portion 50a of the peripheral area 50 is not fixed to the supporting component 26 in one modification. In other words, the display 16 is fixed to the supporting component 26 in an area 50b formed by the left-side end portion, the lower-side end portion, and the right-side end portion of the peripheral area 50. Even in this case, the display 16 is hardly separated from the supporting component 26, and the cover panel 2 fixed to the display 16 is less likely to be deformed outwardly, similarly to the first embodiment.

The area of the peripheral area 50, which is not fixed to the supporting component 26, is not limited to one example illustrated in FIG. 18. For example, the area, which is fixed to the supporting component 26, in the display 16 may be the upper-side end portion and the lower-side end portion of the peripheral area 50.

Figure 19:
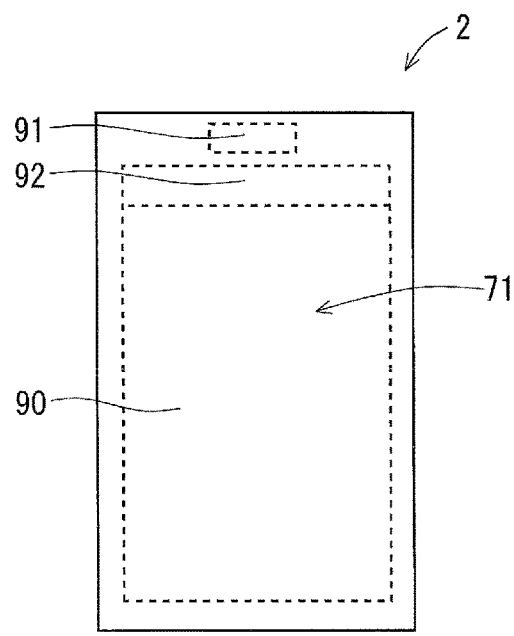
FIG. 19 illustrates a cover panel.
Figure 20:
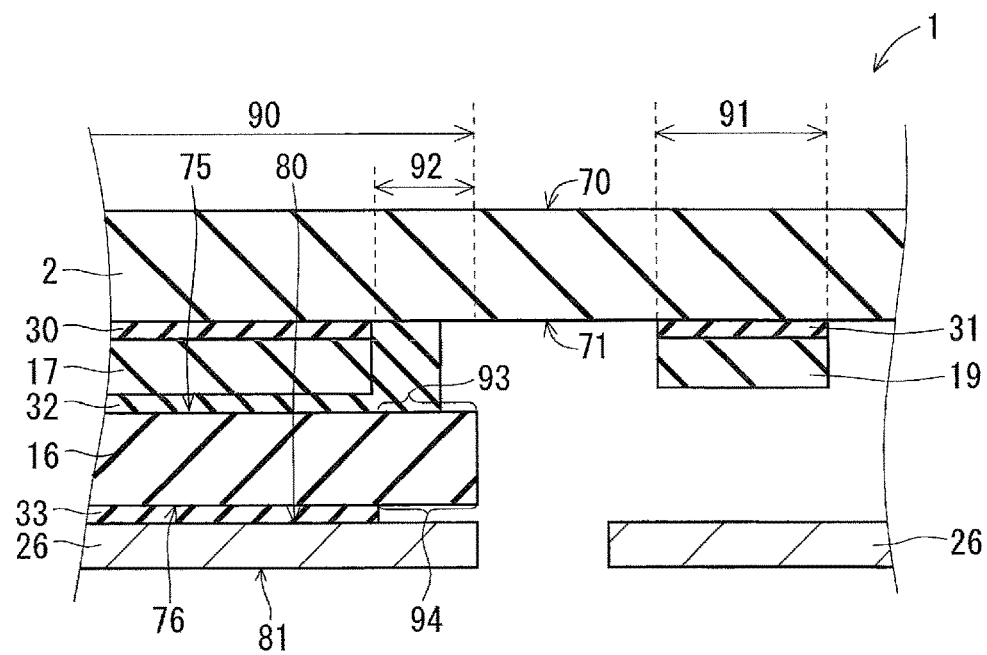
FIG. 20 illustrates a cross-sectional view showing the electronic apparatus.

In a case where an area of the peripheral area 50 close to the piezoelectric vibrator 19 is not fixed to the supporting component 26 here, interference in the vibration of the cover panel 2 by the piezoelectric vibrator 19 caused by fixing the supporting component 26 to the display 16 can be reduced. In other words, when the end portion of the rear-side main surface 76 of the display 16 close to the piezoelectric vibrator 19 is not fixed to the supporting component 26, the interference in the vibration of the cover panel 2 by the piezoelectric vibrator 19 caused by fixing the supporting component 26 to the display 16 can be reduced. FIG. 19 illustrates the inner main surface 71 of the cover panel 2. FIG. 20 illustrates a cross-sectional view showing the electronic apparatus 1 and corresponds to FIG. 11.

In one modification, an area of the inner main surface 71 of the cover panel 2 facing the display 16 in the thickness direction of the electronic apparatus 1 is referred to as a "display opposed area 90". An area of the inner main surface 71 of the cover panel 2 facing the piezoelectric vibrator 19 in the thickness direction of the electronic apparatus 1 is referred to as a "piezoelectric vibrator opposed area 91". An area of the display opposed area 90 that faces the piezoelectric vibrator opposed area 91 in the longitudinal direction (vertical direction) of the electronic apparatus 1 is referred to as a "proximate area 92". As illustrated in FIGS. 19 and 20, the proximate area 92 is an area of the display opposed area 90 close to the piezoelectric vibrator 19. The proximate area 92 illustrated in FIG. 19 is located at the upper-side end portion of the display opposed area 90.

As illustrated in FIG. 20, an area of the front-side main surface 75 of the display 16 that faces the proximate area 92 in the thickness direction of the electronic apparatus 1 is referred to as a "display-side proximate area 93". An area of the rear-side main surface 76 of the display 16 opposite to the display-side proximate area 93 is a "non-fixed area 94" that is not fixed to the supporting component 26.

As illustrated in FIG. 20, the non-fixed area 94 of the rear-side main surface 76 of the display 16 is not fixed to the supporting component 26. It can thus be said that the proximate area 92 of the cover panel 2 is not fixed to the supporting component 26 with the display 16 therebetween. The proximate area 92 of the display opposed area 90 close to the piezoelectric vibrator 19 is not fixed to the supporting component 26. This can reduce the suppression of the vibration of the cover panel 2 due to the supporting component 26 fixed to the display 16, the cover panel 2 being vibrated by the piezoelectric vibrator 19.

Figure 21:
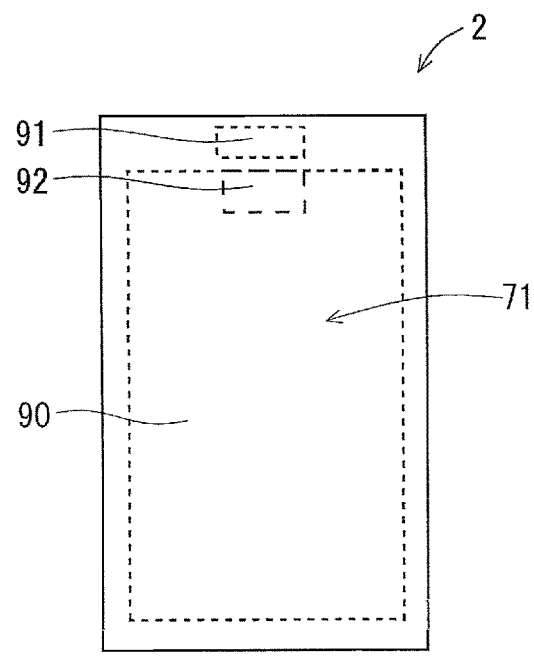
FIG. 21 illustrates the cover panel.

The proximate area 92, the display-side proximate area 93, and the non-fixed area 94 may be appropriately changed in size. FIG. 21 illustrates the inner main surface 71 of the cover panel 2 and corresponds to FIG. 19. In one example illustrated in FIG. 21, the proximate area 92 is located in the central area of the upper-side end portion of the display opposed area 90. In other words, a planar dimension of the proximate area 92 illustrated in FIG. 21 is smaller than that of the proximate area 92 illustrated in FIG. 19. When the planar dimension of the proximate area 92 is small, a planar dimension of the display-side proximate area 93 that faces the proximate area 92 in the thickness direction of the electronic apparatus 1 and a planar dimension of the non-fixed area 94 of the rear-side main surface 76 of the display 16 opposite to the display-side proximate area 93 are also small. Even in this case, however, the proximate area 92 of the display opposed area 90 close to the piezoelectric vibrator 19 is not fixed to the supporting component 26. Therefore, this can further reduce the suppression of the vibration of the cover panel 2, which is vibrated by the piezoelectric vibrator 19, due to the supporting component 26 fixed to the display 16 in comparison with the case where the entire area of the peripheral area 50 of the rear-side main surface 76 of the display 16 is fixed to the supporting component 26.

Figure 22:
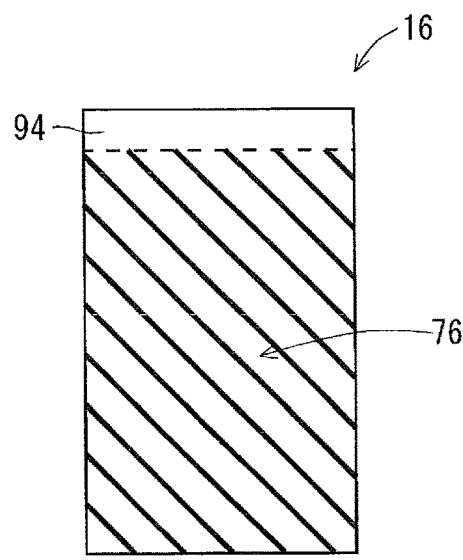
FIG. 22 illustrates the display.
Figure 23:
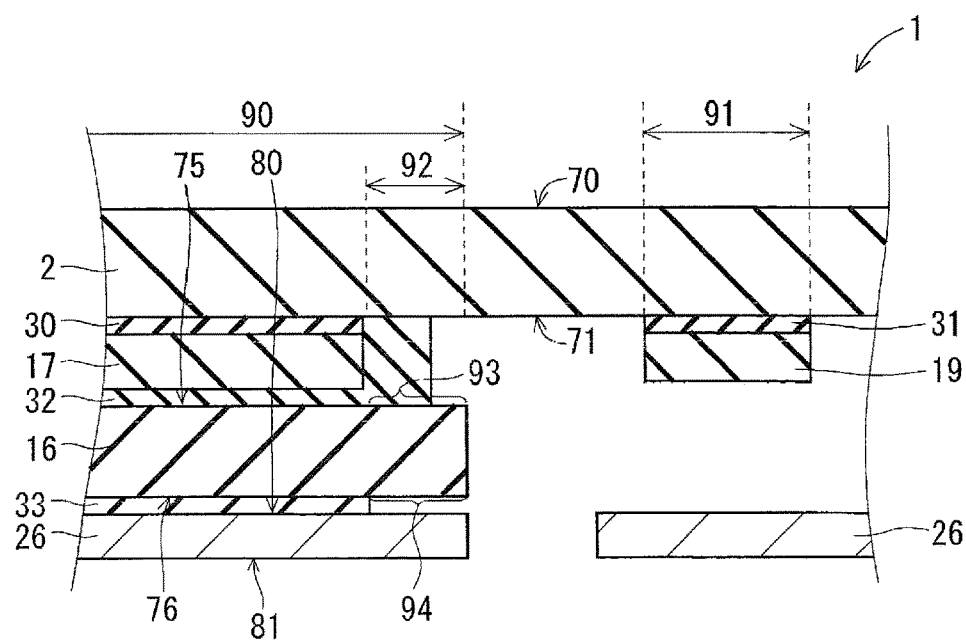
FIG. 23 illustrates a cross-sectional view showing the electronic apparatus.

In the first modification of the first embodiment, the rear-side main surface 76 of the display 16 may comprise the non-fixed area 94. FIG. 22 illustrates the rear-side main surface 76 of the display 16. FIG. 23 illustrates a cross-sectional view showing the electronic apparatus 1 and corresponds to FIG. 20.

In one example illustrated in FIGS. 22 and 23, the upper-side end portion of the rear-side main surface 76 of the display 16 is the non-fixed area 94. An area of the rear-side main surface 76 of the display 16 except for the non-fixed area 94 is fixed to the front-side main surface 80 of the supporting component 26 with the bonding material 33.

As illustrated in FIG. 23, the non-fixed area 94 of the rear-side main surface 76 of the display 16 is not fixed to the supporting component 26, so that the proximate area 92 of the cover panel 2 is not fixed to the supporting component 26 with the display 16 therebetween, similarly to one example described above. The proximate area 92 of the display opposed area 90 close to the piezoelectric vibrator 19 is not fixed to the supporting component 26. This can reduce the suppression of the vibration of the cover panel 2 due to the supporting component 26 fixed to the display 16, the cover panel 2 being vibrated by the piezoelectric vibrator 19.

In the first modification of the first embodiment, the proximate area 92, the display-side proximate area 93, and the non-fixed area 94 may be appropriately changed in size even in a case where the rear-side main surface 76 of the display 16 comprises the non-fixed area 94. For example, the proximate area 92 may be set as illustrated in FIG. 21. In this case, the planar dimension of the non-fixed area 94 is also reduced as illustrated in FIG. 24. FIG. 24 illustrates the rear-side main surface 76 of the display 16 and corresponds to FIG. 22. Even in this case, the proximate area 92 of the display opposed area 90 close to the piezoelectric vibrator 19 is not fixed to the supporting component 26. This can further reduce the suppression of the vibration of the cover panel 2, which is vibrated by the piezoelectric vibrator 19, due to the supporting component 26 fixed to the display 16 in comparison with the electronic apparatus 1 according to the first modification of the first embodiment.

In the second modification of the first embodiment, part of the peripheral area 50 or part of the rear-side main surface 76 of the display 16 may not be fixed to the supporting component 26.

Second Embodiment

FIG. 25 illustrates a cross-sectional view showing the electronic apparatus 1 according to a second embodiment and corresponds to FIG. 11. As illustrated in FIG. 25, the rear-side main surface 76 of the display 16 is fixed to the supporting component 26 with a bonding material 35 in the electronic apparatus 1 according to the second embodiment. In the second embodiment different from the first embodiment, the area of the rear-side main surface 76 of the display 16 except for the peripheral area 50 is also fixed to the supporting component 26 with the bonding material 35. Herein, a case in which the display 16 does not include the display case 16b and does not comprise the non-display area 42 on the front-side main surface 75 will be described as an example. Nevertheless, the display 16 may include the display case 16b (see FIGS. 13 and 17) and may comprise the non-display area 42 on the front-side main surface 75 (see FIG. 16). The rest of the configuration of the electronic apparatus 1 in the second embodiment is the same as that in the first embodiment.

Figure 26:
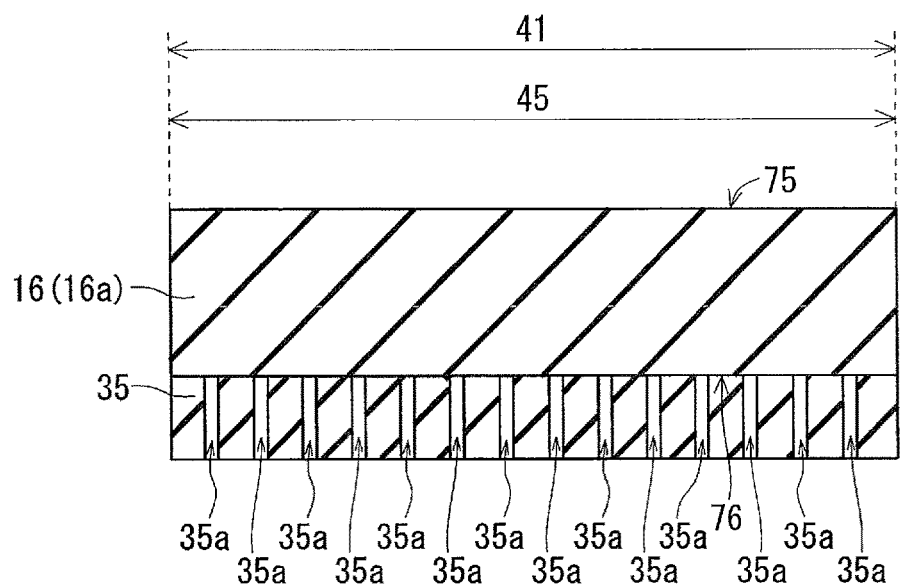
FIG. 26 illustrates a cross-sectional view showing the display and the bonding material.
Figure 27:
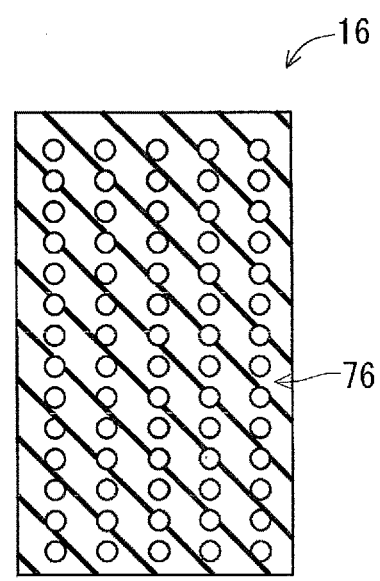
FIG. 27 illustrates the display.

FIG. 26 illustrates the display 16 and the bonding material 35 and corresponds to FIG. 13. FIG. 27 illustrates the rear-side main surface 76 of the display 16 and corresponds to FIG. 12. A double-sided tape including a base material having elasticity, such as a foam base material, is used as the bonding material 35 in the second embodiment. The bonding material 35 includes the base material having elasticity, so that the bonding material 35 has elasticity. In a case where the bonding material 35 does not have elasticity, the force is easily applied to the whole display 16 when applied to the surface of the electronic apparatus 1 in the thickness direction of the electronic apparatus 1. Thus, the display on the display 16 is quite likely to be distorted.

However, in a case where the display 16 and the supporting component 26 are fixed to each other with the bonding material 35 having elasticity, the bonding material 35 is deformed in the thickness direction of the electronic apparatus 1 when the force is applied to the surface of the electronic apparatus 1 in the thickness direction, to thereby make the force difficult to be applied to the display 16. Therefore, as illustrated in FIG. 26, even when the area of the rear-side main surface 76 of the display 16 opposite to the display area 41 is fixed to the supporting component 26, the display on the display 16 (display area 41) can be less affected.

As illustrated in FIGS. 26 and 27, the bonding material 35 includes a plurality of through holes 35a that penetrate the bonding material 35 in the thickness direction of the bonding material 35. For the use of the double-sided tape, air easily enters a gap between the double-sided tape and a fixed component that are fixed to each other in a wide area. More specifically, air easily enters a gap between the display 16 and the bonding material 35 and between the supporting component 26 and the bonding material 35. When the display 16 is fixed to the supporting component 26 while the air remains between the display 16 and the supporting component 26, the force caused by the air is applied to the display 16. If the portion of the display 16 to which the force caused by the air is applied is the display portion 16a, the display on the display 16 (display area 41) may be distorted.

However, in the case where the bonding material 35 includes the plurality of through holes 35a as illustrated in FIGS. 26 and 27, the air that has entered the gap between the display 16 and the bonding material 35 when the bonding material 35 has been bonded to the display 16 can be pushed out of the through holes 35a by the application of pressure to the bonding material 35 after the bonding material 35 has been bonded to the display 16. Similarly, the air that has entered the gap between the supporting component 26 and the bonding material 35 when the bonding material 35 has been bonded to the supporting component 26 can be pushed out of the through holes 35a by the application of pressure to the bonding material 35 after the bonding material 35 has been bonded to the supporting component 26. As a result, even when the wide area of the rear-side main surface 76 of the display 16 is fixed to the supporting component 26 as illustrated in FIGS. 26 and 27, the distortion of the display on the display 16 caused by the force applied to the display 16 due to the air that has entered the gap between the display 16 and the supporting component 26 can be suppressed.

Even in the case where the bonding material 35 is used, the cover panel 2 is fixed to the supporting component 26 with the display 16 therebetween, so that the display 16 is hardly separated from the supporting component 26 similarly to the first embodiment. Thus, the cover panel 2 fixed to the supporting component 26 with the display 16 therebetween is less likely to be bent outwardly. As a result, the cover panel 2 can be less likely to break.

The shape or the like of the through holes 35a located in the bonding material 35 is not limited to one example illustrated in FIGS. 26 and 27. The area of the rear-side main surface 76 of the display 16 that is fixed to the supporting component 26 with the bonding material 35 is not limited to one example illustrated in FIGS. 26 and 27. For example, in the case where the display 16 is fixed to the supporting component 26 in the peripheral area 50 of the rear-side main surface 76 similarly to the first embodiment, the bonding material 35 in the second embodiment may be used. It should be noted that the display 16 is less likely to be separated from the supporting component 26 when the wide area of the rear-side main surface 76 of the display 16 is fixed to the supporting component 26, and thus the cover panel 2 is less likely to be bent outwardly.

Third Embodiment

Figure 28:
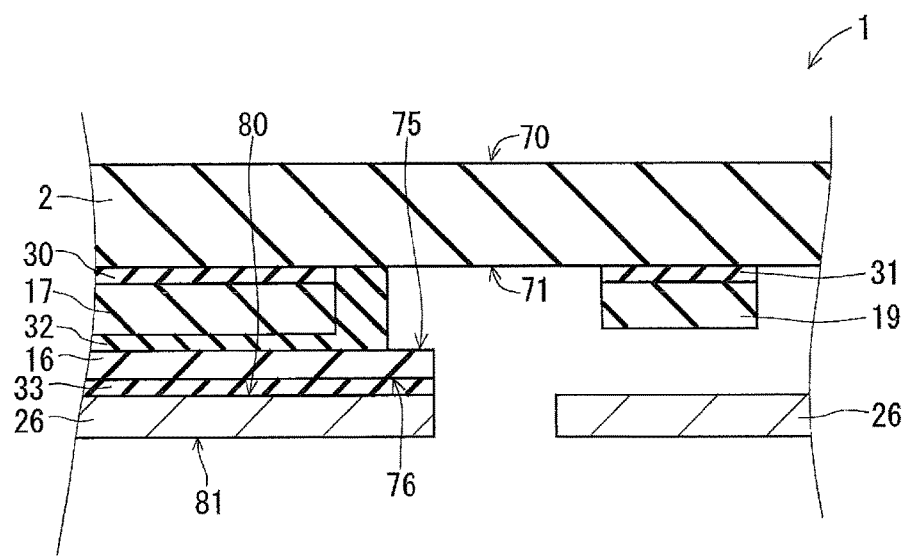
FIG. 28 illustrates a cross-sectional view showing the electronic apparatus.

FIG. 28 illustrates a cross-sectional view showing the electronic apparatus 1 according to a third embodiment and corresponds to FIG. 11. In the third embodiment, a film organic electroluminescence (EL) including, for example, a film-shaped substrate is used as the display 16. In other words, a display capable of being used while being bent serves as the display 16. In the display 16, the area of the rear-side main surface 76 except for the peripheral area 50 is also fixed to the supporting component 26 with the bonding material 33. The rest of the configuration of the electronic apparatus 1 in the third embodiment is the same as that in the first embodiment.

In the case where the display capable of being used while being bent serves as the display 16 as in one embodiment, the display on the display 16 is less likely to be distorted even when the force is applied to the surface of the electronic apparatus 1 in the thickness direction of the electronic apparatus 1 to bend the display 16. In other words, in the case where the display capable of being used while being bent is used as the display 16, the display on the display 16 is hardly distorted even when the display 16 to which the force is easily applied is fixed to the supporting component 26.

The cover panel 2 is fixed to the supporting component 26 with the display 16 therebetween. Thus, the cover panel 2 is less likely to be bent outwardly. As a result, the cover panel 2 is less likely to break.

In addition, the bonding material 35 in the second embodiment may be used in the third embodiment. In other words, the display (display 16) capable of being used while being bent may be fixed to the supporting component 26 with the bonding material 35 in the second embodiment.

Modification

Figure 29:
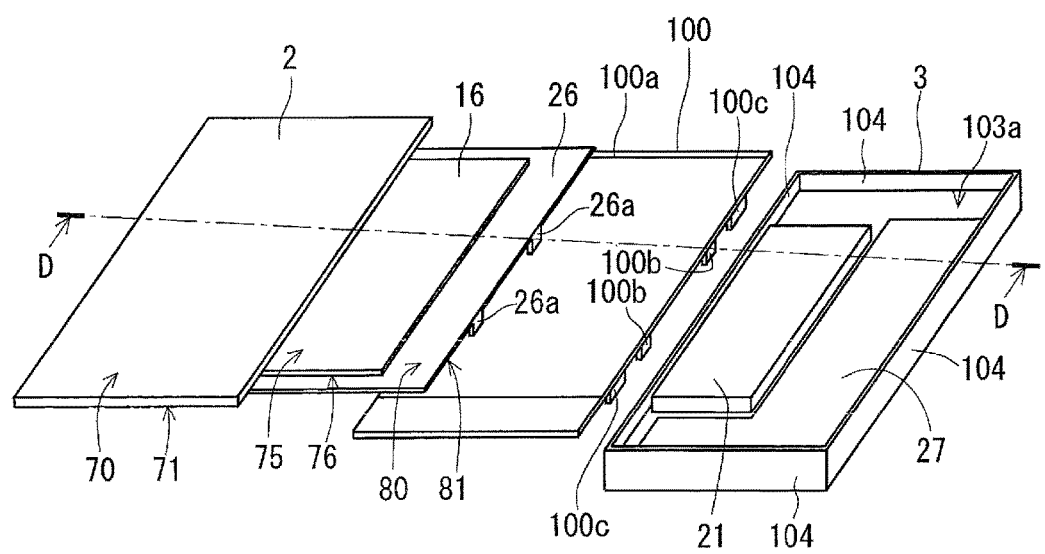
FIG. 29 illustrates an exploded perspective view showing the electronic apparatus.
Figure 30:
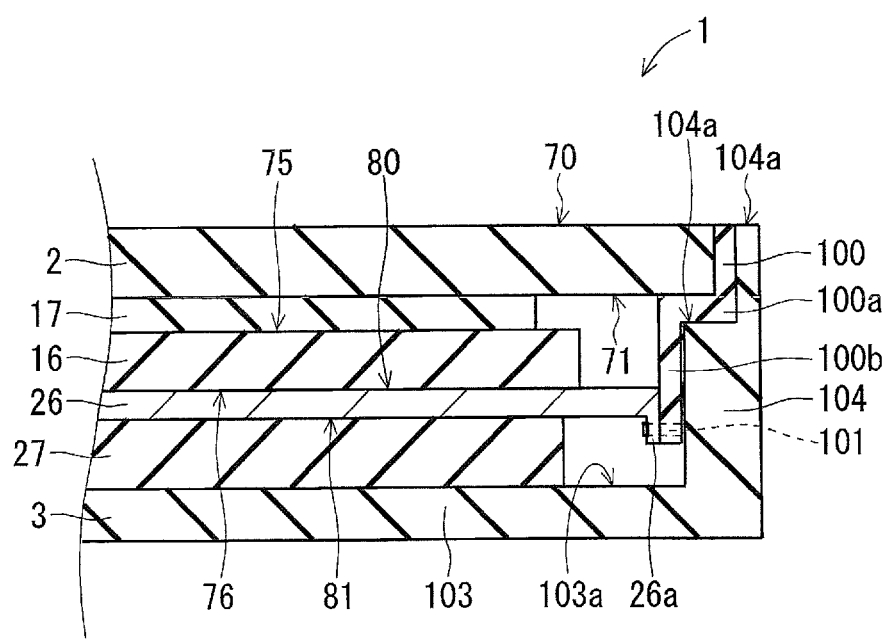
FIG. 30 illustrates a cross-sectional view showing the electronic apparatus.

The cover panel 2 and the supporting component 26 may be fixed to the case 3 with a fixing component therebetween. FIG. 29 illustrates an exploded perspective view showing the electronic apparatus 1 according to one modification and corresponds to FIG. 9. FIG. 30 illustrates a cross-sectional view showing the electronic apparatus 1 taken along a D-D line illustrated in FIG. 29.

As illustrated in FIGS. 29 and 30, the case 3 is formed of one component in the electronic apparatus 1 according to one modification. The case 3 has a substantially box shape with an upper surface open. The case 3 comprises a bottom portion 103 forming the rear surface of the electronic apparatus 1 and four side wall portions 104. The battery 21 and the printed circuit board 27 are disposed on a bottom surface 103a in the case 3 formed by the bottom portion 103.

The supporting component 26 is fixed to the case 3 with a fixing component 100 therebetween. A body portion 100a of the fixing component 100 has, for example, a frame shape. The body portion 100a of the fixing component 100 is disposed on a step portion of a front surface 104a of the side wall portion 104. The fixing component 100 comprises a fixing portion 100b that extends from the body portion 100a toward the bottom surface 103a of the case 3 when the fixing component 100 is disposed on the front surface 104a of the side wall portion 104. On the other hand, the supporting component 26 comprises a fixing portion 26a that extends from an end portion of the rear-side main surface 81 of the supporting component 26 toward the bottom surface 103a of the case 3. The fixing portion 100b of the fixing component 100 and the fixing portion 26a of the supporting component 26 are formed so as to face (contact) each other in the assembly of the electronic apparatus 1. As exemplified in FIG. 30, the fixing portion 100b and the fixing portion 26a that face each other are fastened with a screw 101, to thereby fix the fixing component 100 and the supporting component 26 to each other. The fixing portion 100 may be fixed to the supporting component 26 by engaging with each other or using an adhesive in a way that is not limited to the use of the screw 101.

The fixing component 100 is fixed to the case 3 in a similar manner in which the supporting component 26 is fixed to the fixing component 100 as described above. For example, a fixing portion 100c located on the fixing component 100 is fixed to a fixing component (not shown) located on the side wall portion in the case 3 by being fastened with a screw, engaging with each other, or using an adhesive.

Since the supporting component 26 and the fixing component 100 are fixed to each other and the fixing component 100 and the case 3 are fixed to each other in this manner, it can be said that the supporting component 26 is fixed to the case 3 with the fixing component 100 therebetween. The supporting component 26 has rigidity increased by being fixed to the case 3.

The cover panel 2 is fixed to the body portion 100a of the fixing component 100 while being fixed to the supporting component 26 with the display 16 and the touch panel 17 therebetween similarly to the first embodiment. The cover panel 2 is fixed to the supporting component 26 with the display 16 and the touch panel 17 therebetween, so that the cover panel 2 is less likely to be bent outwardly similarly to the first embodiment. As a result, the cover 2 panel can be less likely to break also in one modification.

The cover panel 2 and the supporting component 26 may also be fixed to the case 3 with the fixing component 100 therebetween in the first to third modifications of the first embodiment, in the second embodiment, or in the third embodiment instead of the first embodiment.

In the above description, the case in which the technology of the disclosure is applied to the mobile phones has been described as an example. The technology of the disclosure is also applicable to other electronic apparatuses in addition to the mobile phones such as the smartphones. For example, the technology of the disclosure is also applicable to tablet terminals and wearable mobile electronic apparatuses worn in the arm or the like.

While the electronic apparatus 1 has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

The invention claimed is:

1. An electronic apparatus, comprising:
   a case;
   a panel located on a surface of the electronic apparatus;
   a display that comprises a first surface including a display screen and a second surface opposite to the first surface and that is accommodated in the case;
   a supporting component that is fixed to the case in the case and supports the display,
   wherein the display is fixed to the panel in the first surface and fixed to the supporting component in the second surface; and
   a piezo-electric vibrator fixed to the panel, wherein the supporting component further includes an opening configured to allow passage of at least one cable for connection to the piezo-electric vibrator.

2. The electronic apparatus according to claim 1, wherein the display is fixed to the supporting component in a first peripheral area of the second surface.

3. The electronic apparatus according to claim 2, wherein the display includes:
   a display portion including the display screen; and
   a display case comprising a side wall portion that covers side surface of the display portion and a bottom portion that covers a bottom surface of the display portion,
   an outer surface of the bottom portion is the second surface, and
   the display is fixed to the supporting component in a second peripheral area of the outer surface of the bottom portion, the side wall portion being located on the second peripheral area.

4. The electronic apparatus according to claim 1, wherein an end portion of the second surface close to the piezoelectric vibrator is not fixed to the supporting component.

5. The electronic apparatus according to claim 1, wherein the display is fixed to the supporting component with a double-sided tape including through holes that penetrate the double-sided tape in a thickness direction of the double-sided tape.

6. The electronic apparatus according to claim 1, wherein the display is fixed to the supporting component with a double-sided tape including a base material having elasticity.

7. The electronic apparatus according to claim 1, wherein the display is capable of being used while being bent.

8. The electronic apparatus according to claim 1, wherein the panel comprises a layer of sapphire.

* * * * *